(12) United States Patent
Aoki et al.

(10) Patent No.: US 8,575,795 B2
(45) Date of Patent: Nov. 5, 2013

(54) MOLDED STATOR WITH ANNULAR SUBSTRATE HAVING INNER DIAMETER SMALLER THAN STATOR CORE INNER DIAMETER AND MOLDED MOTOR HAVING THE MOLDED STATOR

(75) Inventors: Kenichi Aoki, Kitakyushu (JP);
Fumihiko Kitani, Kitakyushu (JP);
Tomonori Hirose, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 382 days.

(21) Appl. No.: 12/499,562

(22) Filed: Jul. 8, 2009

(65) Prior Publication Data

US 2009/0267424 A1    Oct. 29, 2009

Related U.S. Application Data

(63) Continuation of application No. PCT/JP2008/055923, filed on Mar. 27, 2008.

(30) Foreign Application Priority Data

Apr. 4, 2007    (JP) ................................. 2007-098506

(51) Int. Cl.
*H02K 1/04*      (2006.01)
*H02K 15/12*     (2006.01)
*H02K 3/32*      (2006.01)
*H02K 3/38*      (2006.01)

(52) U.S. Cl.
USPC ....................... 310/43; 310/216.115; 310/260

(58) Field of Classification Search
USPC ............ 310/43, 216.114, 216.115, 45, 254.1, 310/260
IPC ............................... H02K 3/30,3/32, 3/38, 1/04
See application file for complete search history.

(56) References Cited

U.S. PATENT DOCUMENTS 4,755,709 A  *  7/1988  De Jager .......................... 310/43
5,895,994 A  *  4/1999  Molnar et al. ........ 310/216.115

(Continued)

FOREIGN PATENT DOCUMENTS

JP    2000-333429    11/2000
JP    2003-244908     8/2003

(Continued)

OTHER PUBLICATIONS

Machine translation of Yamazaki et al.*

(Continued)

*Primary Examiner* — Burton Mullins
*Assistant Examiner* — Michael Andrews
(74) *Attorney, Agent, or Firm* — Ditthavong Mori & Steiner, P.C.

(57) ABSTRACT

A stator includes an annular substrate, an outer-diameter portion of the substrate provided at a tip end of an outer-diameter leg of a bobbin, the substrate having a smaller inner diameter than an inner diameter of the stator core. When stator resin provides sealing, the outer-diameter portion of the substrate can be supported by the tip end of the outer-diameter leg of the bobbin, and an inner-diameter portion of the substrate can be supported by a mold. Accordingly, even when the moment of inertia of a molded motor is increased, the substrate can be prevented from being deformed by a molding pressure with the stator resin, without the area of the substrate being decreased.

9 Claims, 3 Drawing Sheets

(56) References Cited

U.S. PATENT DOCUMENTS

| | | | | |
|---|---|---|---|---|
| 6,166,468 | A * | 12/2000 | Suzuki et al. | 310/90 |
| 6,822,356 | B2 * | 11/2004 | Suzuki et al. | 310/43 |
| 7,015,619 | B2 * | 3/2006 | Tanabe et al. | 310/254.1 |
| 7,667,357 | B2 * | 2/2010 | Okada et al. | 310/49.32 |
| 2005/0093379 | A1 * | 5/2005 | Tanabe et al. | 310/43 |
| 2006/0220474 | A1 * | 10/2006 | Yoshida | 310/43 |
| 2007/0052310 | A1 * | 3/2007 | Sakai et al. | 310/43 |
| 2007/0290570 | A1 * | 12/2007 | Okada et al. | 310/43 |

FOREIGN PATENT DOCUMENTS

| | | | | |
|---|---|---|---|---|
| JP | 2003244908 A | * | 8/2003 | |
| JP | 2005-080445 | | 3/2005 | |
| JP | 2006014478 A | * | 1/2006 | H02K 11/00 |

OTHER PUBLICATIONS

Machine translation of JP2006-014478 (published Jan. 2006, translated Aug. 2012).*

* cited by examiner

MOLDED STATOR WITH ANNULAR SUBSTRATE HAVING INNER DIAMETER SMALLER THAN STATOR CORE INNER DIAMETER AND MOLDED MOTOR HAVING THE MOLDED STATOR

CROSS-REFERENCE TO RELATED APPLICATION

The present application is related to PCT patent application Ser. No. PCT/JP2008/055923 titled "ANNULAR STATOR CORE, METHOD OF MANUFACTURING SAME, AND MOLDED MOTOR", which claims priority to Japanese Patent Application No. 2007-098506, filed Apr. 4, 2007. The contents of these applications are incorporated herein by reference in their entirety.

BACKGROUND OF THE INVENTION

1. Field of the Invention

The present invention relates to an annular stator in which resin seals an annular stator core and an annular substrate, and to a molded motor.

2. Description of the Related Art

In a conventional molded motor, an annular substrate for coil connection is attached to tip ends of two legs formed at an end of a bobbin inserted into a slot of an annular stator core (see Japanese Unexamined Patent Application Publication No. 2005-80445, FIGS. 3 and 4). A cross-sectional shape of the bobbin at the end thereof passing through an axis thereof is a rectangular shape with one of four sides being open. The axis represents a center axis of the bobbin, the center axis extending in parallel to a rotation axis of the molded motor. A portion of the bobbin opposite to the open side is adjacent to the stator core. Two portions of the bobbin extending from the open side serve as the legs. The legs include a leg at an inner-diameter side of the bobbin (inner-diameter leg) and a leg at an outer-diameter side of the bobbin (outer-diameter leg). An inner-diameter portion of the substrate is attached to the tip end of the inner-diameter leg. An outer-diameter portion of the substrate is attached to the tip end of the outer-diameter leg. A coil is wound around the bobbin in an area between the inner-diameter leg and the outer-diameter leg of the bobbin. An end of the wounded coil is soldered to the substrate.

In this state, stator resin provides sealing for the substrate, the coil, the bobbin, and the stator core, thereby providing an annular stator.

SUMMARY OF THE INVENTION

A stator according to an aspect of the present invention includes an annular substrate, an outer-diameter portion of the substrate provided at a tip end of an outer-diameter leg of a bobbin, the substrate having a smaller inner diameter than an inner diameter of the stator core. When stator resin provides sealing, the outer-diameter portion of the substrate can be supported by the tip end of the outer-diameter leg of the bobbin, and an inner-diameter portion of the substrate can be supported by a mold. Accordingly, even when the moment of inertia of a molded motor is increased, the substrate can be prevented from being deformed by a molding pressure with the stator resin, without the area of the substrate being decreased.

A method of manufacturing a stator according to another aspect of the present invention is provided. The stator includes an annular stator core having a slot; a bobbin inserted into the slot, the bobbin including an outer-diameter leg formed near an outer-diameter side of the stator core and an inner-diameter leg formed near an inner-diameter side of the stator core; a coil wound around the bobbin in an area between the outer-diameter leg and the inner-diameter leg; an annular substrate, an outer-diameter portion of the substrate provided at a tip end of the outer-diameter leg, an end of the coil connected to the substrate, the substrate having a smaller inner diameter than an inner diameter of the stator core; and stator resin providing sealing for a non-coil side of the outer-diameter leg, an outer-diameter side of the substrate, a non-bobbin side of the substrate, an inner-diameter side of the substrate, and a gap among a bobbin side of the substrate, the bobbin, and the coil. The method includes the steps of, when the stator resin provides sealing, supporting the bobbin side of the substrate near the outer-diameter portion by the tip end of the outer-diameter leg, and supporting the bobbin side of the substrate near an inner-diameter portion by a mold.

In the above configuration, the mold may support the entire circumference of the bobbin side of the substrate near the inner-diameter portion.

In the above configuration, the mold may support the bobbin side of the substrate near the inner-diameter portion at a plurality of positions arranged along a circumferential direction.

In the above configuration, the substrate may have a substrate pattern in a region except a region which comes into contact with the mold.

In the above configuration, a length in an axial direction of the inner-diameter leg may be smaller than a length in the axial direction of the outer-diameter leg, and a thickness of the inner-diameter leg may be smaller than a thickness of the outer-diameter leg.

BRIEF DESCRIPTION OF THE DRAWINGS

The present invention will be described in further detail with reference to the accompanying drawings wherein.

DETAILED DESCRIPTION OF THE PREFERRED EMBODIMENTS

First Embodiment

Figure 1:
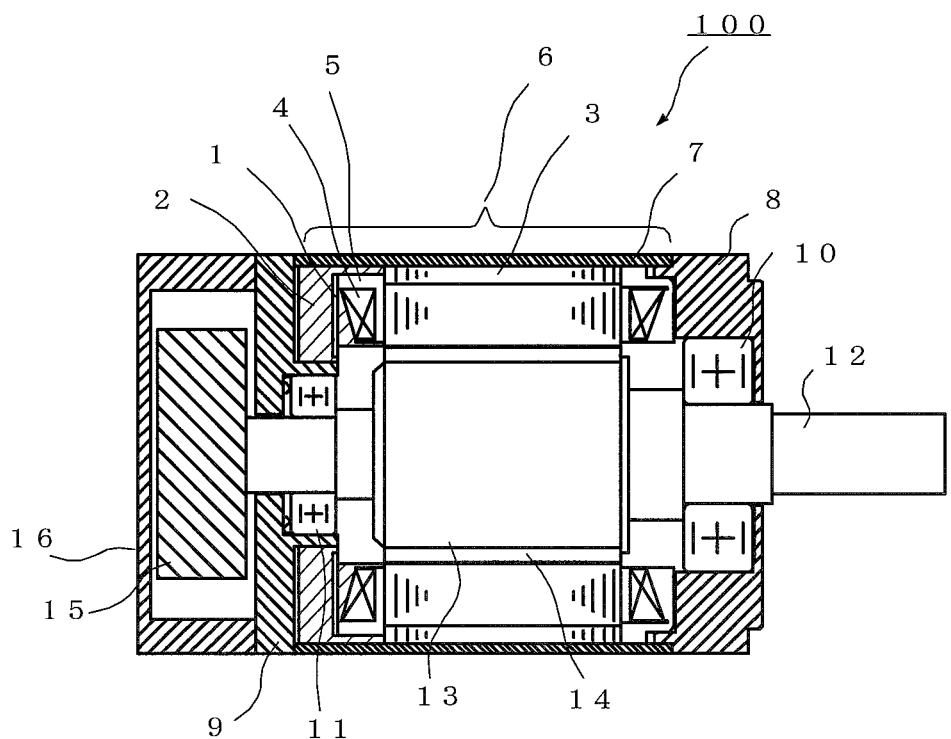
FIG. 1 is a sectional side view showing the overview of a molded motor including an annular substrate according to a first embodiment of the present invention.
Figure 2A:
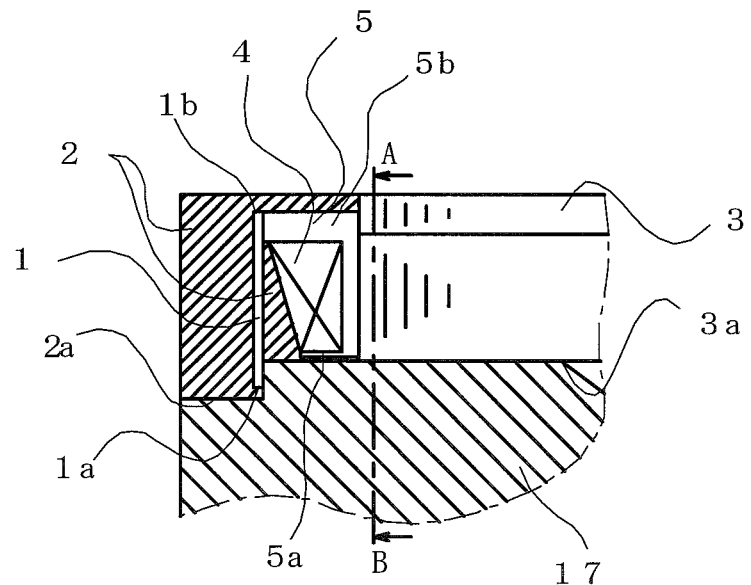
FIGS. 2A and 2B illustrate a substrate and a bobbin in FIG. 1.
Figure 2B:
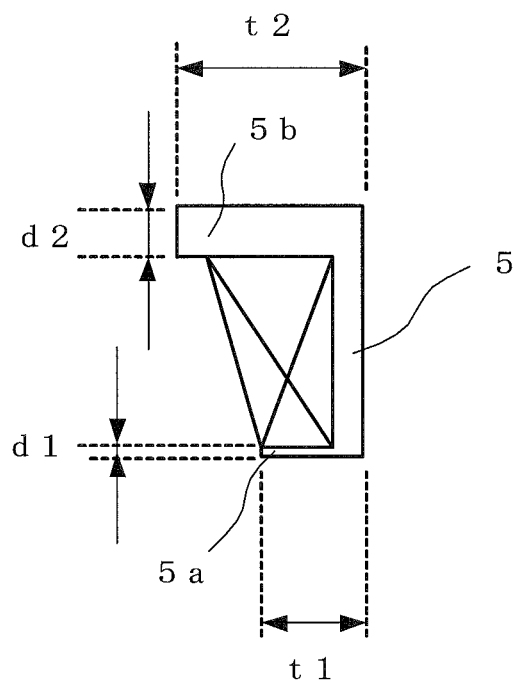

FIG. 1 is a sectional side view showing the overview of a molded motor including an annular substrate according to a first embodiment of the present invention. FIGS. 2A and 2B illustrate a substrate and a bobbin in FIG. 1. In particular, FIG. 2A is an enlarged sectional side view showing a position near the substrate in FIG. 1, and FIG. 2B illustrates the shape of the bobbin in FIG. 1.

Referring to FIG. 1, reference numeral 100 denotes a molded motor, 1 denotes an annular substrate, 2 denotes stator resin, 3 denotes an annular stator core, 4 denotes a coil, 7 denotes a frame, and 5 denotes a bobbin. The substrate 1, the stator resin 2, the stator core 3, the coil 4, the frame 7, and the bobbin 5 define an annular stator 6. Reference numeral 8 denotes a load-side bracket, 9 denotes a non-load-side bracket, 10 denotes a load-side bearing, 11 denotes a non-load-side bearing, 12 denotes a shaft, 13 denotes a rotor, 14 denotes a magnet, 15 denotes an encoder, and 16 denotes an encoder cover.

The load-side bracket 8 is attached to a load side of the stator 6. The non-load-side bracket 9 is attached to a non-load side of the stator 6. The load-side bearing 10 is attached to the load-side bracket 8. The non-load-side bearing 11 is attached to the non-load-side bracket 9. The shaft 12 supports the rotor 13 between the load-side bearing 10 and the non-load-side bearing 11. The shaft 12 is rotatably supported by the load-side bearing 10 and the non-load-side bearing 11. The magnet 14 is attached to the rotor 13. A clearance is formed between the magnet 14 and the stator 6. The encoder 15 is attached to a non-load side of the shaft 12. The encoder 15 is covered with an encoder cover 16 attached to a non-load side of the non-load-side bracket 9.

Next, the stator 6 will be described in details. Referring to FIG. 1, the coil 4 is wounded around the bobbin 5. The bobbin 5 with the coil 4 wounded is inserted into the slot of the stator core 3. The bobbin 5 insulates the coil 4 from the stator core 3. Referring to FIG. 2B, a cross-sectional shape of the bobbin 5 at an end thereof passing through an axis thereof is a rectangular shape with one of four sides being open. The axis represents a center axis of the bobbin 5, the center axis extending in parallel to a rotation axis of the molded motor 100 (rotation axes of the rotor 13 and the shaft 12). A portion of the bobbin 5 opposite to the open side is adjacent to the stator core 3. Two portions of the bobbin 5 extending from the open side serve as legs. The legs include a leg (inner-diameter leg) 5a formed at the bobbin 5 near an inner-diameter side of the stator core 3, and a leg (outer-diameter leg) 5b formed at the bobbin 5 near an outer-diameter side of the stator core 3. The coil 4 is wound around the bobbin 5 in an area between the inner-diameter leg 5a and the outer-diameter leg 5b of the bobbin 5.

Referring to FIG. 2B, a length t1 in an axial direction and a thickness d1 in a radial direction of the inner-diameter leg 5a of the bobbin 5 are set to satisfy Expressions (1) and (2) as follows:

$$t1 < t2 \quad (1), \text{ and}$$

$$d1 < d2 \quad (2),$$

where t2 is a length in the axial direction of the outer-diameter leg 5b of the bobbin 5, and d2 is a thickness in the radial direction of the outer-diameter leg 5b of the bobbin 5. Herein, the radial direction represents a radial direction of the stator core 3 (i.e., a direction perpendicular to the rotation axis of the molded motor 100).

Referring to FIG. 2A, the substrate 1 is provided at a non-load side of the bobbin 5 with the coil 4 wounded. A bobbin-5 side of an outer-diameter portion 1b of the substrate 1 is attached to a tip end of the outer-diameter leg 5b of the bobbin 5. The substrate 1 has a smaller inner diameter than an inner diameter of the stator core 3. Hence, an inner-diameter portion 1a of the substrate 1 is arranged radially inside with respect to an inner-diameter portion 3a of the stator core 3. An end of the wounded coil 4 is soldered to the substrate 1. Thusly, the substrate 1 is connected with the end of the coil 4. The stator resin 2 provides sealing for a non-coil-4 side of the outer-diameter leg 5b of the bobbin 5, a non-coil-4 side of the inner-diameter leg 5a of the bobbin 5, an outer-diameter side of the substrate 1, an inner-diameter side of the substrate 1, a non-bobbin-5 side of the substrate 1, and a gap among a bobbin-5 side of the substrate 1, the bobbin 5, and the coil 4. The stator resin 2 may not provide sealing for the non-coil-4 side of the inner-diameter leg 5a of the bobbin 5. An inner-diameter portion 2a of the stator resin 2 is arranged radially inside with respect to the inner-diameter portion 1a of the substrate 1.

The inner-diameter portion 1a of the substrate 1 is arranged radially inside with respect to the inner-diameter portion 3a of the stator core 3. Hence, referring to FIG. 2A, when the stator resin 2 provides sealing, a bobbin-5 side of a portion of the substrate 1 near the inner-diameter portion 1a can be supported by a mold 17. In particular, when the stator resin 2 provides sealing, a bobbin-5 side of a portion of the substrate 1 near the outer-diameter portion 1b can be supported by the tip end of the outer-diameter leg 5b of the bobbin 5, and the bobbin-5 side of the portion of the substrate 1 near the inner-diameter portion 1a can be supported by the mold 17. Accordingly, the substrate 1 can be prevented from being warped (deformed) toward the bobbin 5 by a molding pressure with the stator resin 2.

To increase the moment of inertia of the molded motor 100, the inner diameter of the stator core 3 has to be increased, and the inner-diameter leg 5a of the bobbin 5 has to be shifted toward the outer-diameter side of the stator core 3. However, with this embodiment, the bobbin-5 side of the portion of the substrate 1 near the inner-diameter portion 1a is supported by the mold 17. Hence, even when the inner-diameter leg 5a of the bobbin 5 is shifted toward the outer-diameter side of the stator core 3, the substrate 1 can be prevented from being deformed by the molding pressure with the stator resin 2, without the inner diameter of the substrate 1 being changed. That is, even when the moment of inertia of the molded motor 100 is increased, the area of the substrate 1 is not decreased.

As described above, in this embodiment, when the stator resin 2 provides sealing, a bobbin-5 side of a portion of the substrate 1 near the outer-diameter portion 1b is supported by the tip end of the outer-diameter leg 5b of the bobbin 5, and the bobbin-5 side of the portion of the substrate 1 near the inner-diameter portion 1a is supported by the mold 17. Accordingly, even when the moment of inertia of the molded motor 100 is increased, the substrate 1 can be prevented from being deformed by the molding pressure with the stator resin 2, without the area of the substrate 1 being decreased.

In addition, the length t1 in the axial direction and the thickness d1 in the radial direction of the inner-diameter leg 5a of the bobbin 5 are set to satisfy Expressions (1) and (2) described above. That is, the substrate 1 is not supported by the inner-diameter leg 5a of the bobbin 5, and the thickness in the radial direction of the inner-diameter leg 5a of the bobbin 5 is decreased. Accordingly, the number of winding turns of the coil 4 can be increased as compared with the above-mentioned conventional configuration, and hence, motor characteristic can be increased.

Preferably, a substrate pattern is not arranged near the inner-diameter portion 1a of the substrate 1. Accordingly, when the stator resin 2 provides sealing, the substrate pattern of the substrate 1 can be prevented from being damaged by the mold 17.

Figure 3:
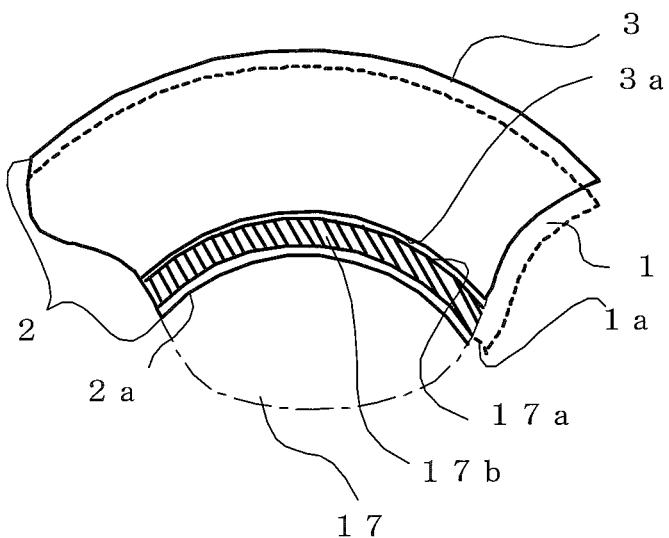
FIG. 3 illustrates the shape of a mold according to the first embodiment.

FIG. 3 illustrates the shape of the mold 17 which supports the portion of the substrate 1 near the inner-diameter portion 1a. Referring to FIG. 3, the inner-diameter portion 1a of the substrate 1 is arranged radially inside with respect to the inner-diameter portion 3a of the stator core 3. A support portion 17b (with hatching in the drawing) of the mold 17 which supports the portion of the substrate 1 near the inner-diameter portion 1a has an annular shape. The annular support portion 17b supports the entire circumference of the inner-diameter portion 1a of the substrate 1. Hence, the support portion 17b can reliably prevent the substrate 1 from being deformed by the molding pressure with the stator resin 2. An outer periphery 17a of the support portion 17b may be provided at the same position as the position of the inner-diameter portion 3a of the stator core 3.

Second Embodiment

Figure 4:
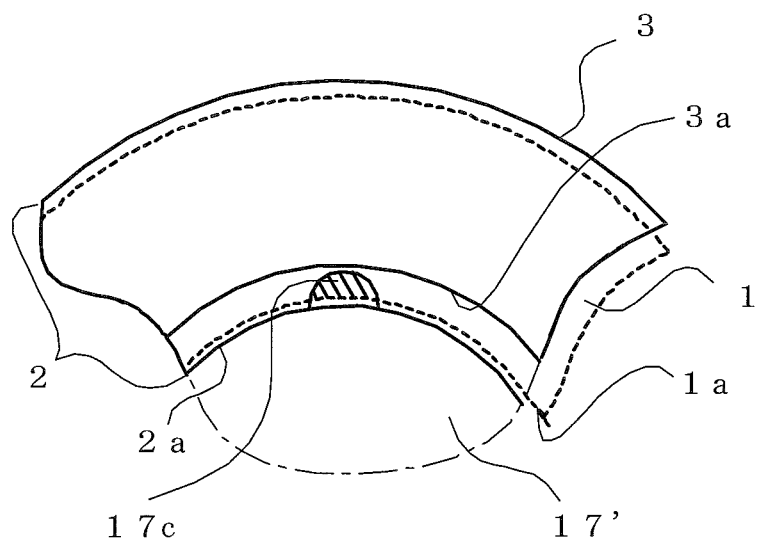
FIG. 4 illustrates the shape of a mold according to a second embodiment of the present invention.

FIG. 4 illustrates the shape of a mold 17' according to a second embodiment of the present invention. The second embodiment is different from the first embodiment only in that the mold 17' having a different shape from that of the mold 17 is used. Other components are similar to those of the first embodiment, and hence the same reference numerals are used for such components.

Referring to FIG. 4, the inner-diameter portion 1a of the substrate 1 is arranged radially inside with respect to the inner-diameter portion 3a of the stator core 3. A support portion 17c (with hatching in the drawing) of the mold 17' which supports the portion of the substrate 1 near the inner-diameter portion 1a has a protruding shape. A plurality of such protruding support portions 17c are provided along a circumferential direction of the inner-diameter portion 1a of the substrate 1. Accordingly, the substrate pattern can be formed in a wide region of the substrate 1 except a region occupied by the plurality of support portions 17c, while the support portions 17c prevent the substrate 1 from being deformed by the molding pressure with the stator resin 2.

Tip ends of the support portions 17c may be provided at the same positions as the position of the inner-diameter portion 3a of the stator core 3. The shape of the mold 17' which supports the portion of the substrate 1 near the inner-diameter portion 1a can be changed in accordance with the degree of deformation of the substrate 1 by the molding pressure with the stator resin 2.

What is claimed is:

1. A stator comprising:
    an annular stator core;
    a bobbin inserted into the stator core, the bobbin having a leg provided at an end surface in an axial direction of the stator core and extending in the axial direction, the leg including an outer-diameter leg provided in a vicinity of an outer-diameter side of the stator core and an inner-diameter leg provided in a vicinity of an inner-diameter side of the stator core;
    a coil wounded around the bobbin between the outer-diameter leg and the inner-diameter leg;
    an annular substrate including only one ring having an inner circumference and an outer circumference, the substrate having a substrate pattern on a surface of the substrate, an outer-diameter portion, and an inner-diameter portion, the outer-diameter portion including the outer circumference and being abutted against and attached to a tip end of the outer-diameter leg, an end of the coil being connected to the substrate, the inner-diameter portion including the inner circumference and having an inner diameter smaller than an inner diameter of the stator core along an entirety of the inner circumference of the inner-diameter portion; and
    stator resin providing sealing for a non-coil side of the outer-diameter leg, an outer-diameter side of the substrate, a non-bobbin side of the substrate, an inner-diameter side of the substrate, and filling a gap among a bobbin side of the substrate, the bobbin, and the coil, the substrate pattern being sealed by the stator resin,
    wherein a length in an axial direction of the inner-diameter leg is smaller than a length in the axial direction of the outer-diameter leg, and
    wherein the stator resin provided on the bobbin side of the substrate has a triangular-shaped cross-section having an inner-diameter first side surface extending in the axial direction from a tip end of the inner-diameter leg to the bobbin side of the substrate, a second side surface abutting and extending along a portion of the bobbin side of the substrate to an area adjacent to the tip end of the outer-diameter leg, and a third side surface extending from the area adjacent to the tip end of the outer-diameter leg to the tip end of the inner-diameter leg.

2. The stator according to claim 1, wherein an unsealed portion is formed at the bobbin side of the substrate in a vicinity of the inner-diameter portion of the substrate.

3. The stator according to claim 2, wherein the unsealed portion has an annular shape and is formed over the entirety of the inner circumference of the bobbin side of the substrate.

4. The stator according to claim 2, wherein a plurality of the unsealed portion are formed along the inner circumference of the bobbin side of the substrate.

5. The stator according to claim 2, wherein the substrate has the substrate pattern in a region except a region occupied by the unsealed portion.

6. A method for manufacturing the stator according to claim 1, wherein the method includes supporting the bobbin side of the substrate along the entirety of the inner circumference of the inner-diameter portion by a mold, and forming the stator resin so as to provide the sealing for the non-coil side of the outer-diameter leg, the outer-diameter side of the substrate, the non-bobbin side of the substrate, the inner-diameter side of the substrate, and the gap among the bobbin side of the substrate, the bobbin, and the coil.

7. A method for manufacturing the stator according to claim 1, wherein the method includes supporting the bobbin side of the substrate at a plurality of portions along the inner circumference of the inner-diameter portion by a mold, and forming the stator resin so as to provide the sealing for the non-coil side of the outer-diameter leg, the outer-diameter side of the substrate, the non-bobbin side of the substrate, the inner-diameter side of the substrate, and the gap among the bobbin side of the substrate, the bobbin, and the coil.

8. A molded motor comprising:
    the stator according to claim 1; and
    a rotor rotatably provided with a clearance provided between the rotor and an inner periphery of the stator core of the stator.

9. The stator according to claim 1, wherein a thickness of the inner-diameter leg in a radial direction of the annular stator core is smaller than a thickness of the outer-diameter leg in the radial direction.

* * * * *